(12) United States Patent
Lebas et al.

(10) Patent No.: US 9,080,574 B2
(45) Date of Patent: Jul. 14, 2015

(54) METHOD AND APPARATUS FOR STORING MECHANICAL ENERGY BY QUASI-ISOTHERMAL EXPANSION AND COMPRESSION OF A GAS

(75) Inventors: Etienne Lebas, Seyssuel (FR); Alexandre Rojey, Rueil-Malmaison (FR)

(73) Assignee: COGEBIO, Irigny (FR)

( * ) Notice: Subject to any disclaimer, the term of this patent is extended or adjusted under 35 U.S.C. 154(b) by 775 days.

(21) Appl. No.: 13/318,188

(22) PCT Filed: May 6, 2010

(86) PCT No.: PCT/FR2010/000348
§ 371 (c)(1),
(2), (4) Date: Oct. 31, 2011

(87) PCT Pub. No.: WO2010/128222
PCT Pub. Date: Nov. 11, 2010

(65) Prior Publication Data
US 2012/0042643 A1  Feb. 23, 2012

(30) Foreign Application Priority Data
May 7, 2009  (FR) .................................... 09 02207

(51) Int. Cl.
*F16D 33/00* (2006.01)
*F04D 25/00* (2006.01)
(Continued)

(52) U.S. Cl.
CPC ................ *F04D 25/00* (2013.01); *F03B 13/06* (2013.01); *H02J 15/003* (2013.01);
(Continued)

(58) Field of Classification Search
CPC ............. F03B 13/06; F03B 17/02; F02C 6/16
USPC ........... 60/327, 456, 398, 416, 413; 91/5, 4 R
See application file for complete search history.

(56) References Cited

U.S. PATENT DOCUMENTS 3,295,505 A  1/1967  Jordan
3,996,741 A  12/1976  Herberg
(Continued)

FOREIGN PATENT DOCUMENTS

DE  3111469  10/1982
EP  0 106 690  4/1984
(Continued)

OTHER PUBLICATIONS

Lemofouet, Energetic Performance of A Hybrid Energy Storage System Based on Compressed Air and Super Capacitors With Maximum Efficiency Point Tracking, IEEE Transactions on Industrial Electronics Aug. 2006. vol. 53. No. 4.*

(Continued)

*Primary Examiner* — Edward Look
*Assistant Examiner* — Daniel Collins
(74) *Attorney, Agent, or Firm* — Jordan IP Law, LLC; Todd A. Vaughn

(57) ABSTRACT

A system for energy storage, in particular for mechanical energy, including a system for quasi-isothermal compression of a gas via a hydraulic fluid. The mechanical energy stored is then released by quasi-isothermal expansion of the gas. The system is also configured to store electrical energy, in particular from intermittent sources such as photovoltaic or wind energy. The storage of excess electrical energy can also be considered for use during consumption peaks.

18 Claims, 10 Drawing Sheets

(51) Int. Cl.
  *F03B 13/06*  (2006.01)
  *H02J 15/00*  (2006.01)
  *F28D 20/00*  (2006.01)
  *F28D 20/02*  (2006.01)

(52) U.S. Cl.
  CPC ............ *F28D 20/0034* (2013.01); *F28D 20/02* (2013.01); *Y02E 10/22* (2013.01); *Y02E 60/17* (2013.01); *Y02E 70/30* (2013.01)

(56) References Cited

U.S. PATENT DOCUMENTS

| | | |
|---|---|---|
| 4,147,204 A | 4/1979 | Pfenninger |
| 4,370,559 A | 1/1983 | Langley, Jr. |
| 4,885,912 A | 12/1989 | Nakhamkin |
| 5,220,954 A | 6/1993 | Longardner |
| 5,507,144 A | 4/1996 | Gray |
| 6,762,926 B1 | 7/2004 | Shiue |
| 2004/0211182 A1* | 10/2004 | Gould .............................. 60/643 |

FOREIGN PATENT DOCUMENTS

| | | | |
|---|---|---|---|
| WO | WO 93/06367 | 4/1993 | |
| WO | WO 2008/139267 | 11/2008 | |
| WO | WO 2008139267 A1 * | 11/2008 | ................ F02C 6/16 |

OTHER PUBLICATIONS

Rufer, Energetic Performance of a Hybrid Energy Storage System based on Compressed Air and Super Capacitors, SPEEDAM 2006.*

* cited by examiner

METHOD AND APPARATUS FOR STORING MECHANICAL ENERGY BY QUASI-ISOTHERMAL EXPANSION AND COMPRESSION OF A GAS

CROSS-REFERENCE TO RELATED APPLICATIONS

The present application is a National Stage Application of PCT International Application No. PCT/FR2010/000348 (filed on May 6, 2010), under 35 U.S.C. §371, which claims priority to French Patent Application No. 0902207 (filed on May 7, 2009), which are each hereby incorporated by reference in their respective entireties.

FIELD OF THE INVENTION

This invention relates to a system for energy storage, in particular for mechanical energy, including a system for quasi-isothermal compression of a gas by means of a hydraulic fluid. The mechanical energy stored is then released by quasi-isothermal expansion of the gas.

This invention also relates to the storage of electrical energy, in particular from intermittent sources such as photovoltaic or wind energy. The storage of excess electrical energy can also be considered for use during consumption peaks.

BACKGROUND OF THE INVENTION

There are a number of energy storage systems that can be used for applications at different power scales.

At a small scale, battery and supercapacitor-type electrochemical systems can be used. These systems nevertheless have a certain number of disadvantages. Batteries represent environmental hazards and have a limited lifespan. Supercapacitors have insufficient energy density for most applications.

At a large scale, the storage of water in a reservoir at elevation is a good option. The water can be released at a chosen time and generate electricity by means of turbines. The main limitation of this technique is the small number of sites that can be adapted without heavy duty and costly work.

The storage of compressed air in an underground cavity (CAES=Compressed Air Energy Storage) is also an interesting option; it has been envisaged in patents, such as U.S. Pat. No. 4,885,912 to Gibbs & Hill, Inc., U.S. Pat. No. 3,996,741 to George M. Herberg, and in patent applications WO 93 06367 to Arnold Grupping and EP 106 690 to Shell International Research. However, the number of available sites is very limited and economically profitable implementation requires coupling with a combined cycle. This leads to very large plants, with major investments. In addition, this solution involves the consumption of fossil fuels, and is inefficient.

Finally, another alternative is hydro-pneumatic storage in which the compression of a gas is performed by pumping a liquid. However, this type of technology must be improved in order to increase efficiency and reduce costs.

Such a system, which uses a liquid piston system as a gas compression device is already known, in particular from document WO 2008 139267 to Ecole Polytechnique Fédérale de Lausanne. A sprayer or a grill integrated in the top portion of the chamber ensures the gas-liquid contact during the compression and expansion phases of the gas so as to maintain quasi-isothermal conditions. In this system, the thermal energy released during the compression phase is discharged into the atmosphere by means of an exchanger. This same exchanger serves to provide calories during the gas expansion phase.

This type of system, while satisfactory, nevertheless has some non-negligible disadvantages. Indeed, the efficacy of this type of storage remains limited in particular due to the energy loss constituted by the discharge of calories during the gas compression phase. In addition, the stored energy restitution phase is accompanied by a cooling of the liquid associated with the expansion of the gas. It is therefore necessary to expend a non-negligible amount of energy to ensure isothermal expansion of the gas.

SUMMARY OF THE INVENTION

This invention proposes that the disadvantages mentioned above be overcome with a hydro-pneumatic storage system that makes it possible to obtain a high energy efficiency by using a system for storing the thermal energy produced during the gas compression phase, which energy is restored during the gas expansion phase.

The invention relates to a system for storing energy, in particular mechanical energy, the system including: (a) at least one container containing a hydraulic fluid and a gas; (b) at least one storage chamber containing the hydraulic fluid; (c) compression-expansion means capable, in "compression" mode, of pumping the hydraulic fluid, and, in "expansion" mode, of expanding the hydraulic liquid. In accordance with the invention, (i) the hydraulic fluid and/or the gas contained in the at least one container is in thermal contact with a thermal energy storage medium contained in a chamber; (ii) the container is connected to the at least one storage chamber by lines enabling the hydraulic fluid to be transported from one to the other, across the compression-expansion means; and (iii) the compression-expansion means are configured to pump the hydraulic fluid from the storage chamber to the container, and also configured to expand the hydraulic liquid contained in the container toward the storage chamber, generating mechanical energy.

The compression-expansion means can be a reversible compression-expansion device, such as a hydraulic pump with pistons also functioning as a piston motor. The compression-expansion means can include means for converting the mechanical energy generated into electrical energy.

In this mechanical energy storage system, the energy storage is obtained by compression of the gas contained in the at least one container by the hydraulic liquid, which is pumped with the compression-expansion means.

The at least one container can be constituted by any volume including a suitable surface for exchange with the hydraulic fluid. It can be constituted, for example, by a tube or plate heat exchanger in which it occupies the compartments in heat exchange with those that are occupied by the hydraulic fluid. It can also be constituted by a tube or a plurality of tubes arranged in the hydraulic fluid storage volume. It can in particular be constituted by a spiral tube.

The gas is a condensable gas, and preferably a gas selected from the group consisting of hydrocarbons, $CO_2$, fluorinated hydrocarbons or fluorinated alkanes. It can also be a non-condensable gas such as nitrogen or ambient air. The thermal storage medium can be a phase-change material.

The at least one container can be located inside the chamber, or it can be located outside the chamber; in this latter case, it advantageously includes a fluid loop that ensures thermal contact between the thermal storage medium of the chamber and the hydraulic fluid contained in the container.

In a particular embodiment, the system in accordance with the invention includes a first group of containers and a second group of containers, in which the gas is ambient air, and, during the mechanical energy storage phase, the first and second groups of containers alternately function in air compression or air suction.

In this embodiment, the container can include a contactor for improving the gas-liquid contact, and, in this system: (i.) in the mechanical energy storage phase, the hydraulic fluid stored in the storage chamber is routed by a line to the compression-expansion means then by a line to the container in order to compress the gas; and (ii) in the mechanical energy restitution phase, the gas is expanded by releasing the fluid by a line to the compression-expansion means, then by the line to the storage chamber.

In the energy storage phase, the contactor enables the gas to be kept quasi-isothermal and the calories to be transferred to the hydraulic fluid, in which a fluid loop enables the calories from the fluid to be transported to the thermal storage medium; in the energy restitution phase, the fluid loop enables the calories stored in the thermal storage medium to be restored to the hydraulic fluid.

In another particular embodiment, the system in accordance with the invention also includes a device making it possible to provide the thermal storage medium with external thermal energy, such as a solar collector or a heat exchanger running on combustion gases or other external heat sources.

List of reference numbers used in the figures is provided as follows.

| | |
|---|---|
| 1, 2, 3 | Gas |
| 4, 5, 6 | Hydraulic fluid |
| 7, 8 | Hydraulic fluid transfer line |
| 9 | Hydraulic fluid |
| 10 | Thermal storage medium |
| 11 | Chamber |
| 12 | Thermal insulator |
| 13 | Storage chamber |
| 14, 15, 16 | Containers |
| 17, KT1, KT2 | Reversible compression-expansion device |
| 18, 19 | Hydraulic fluid transfer lines |
| 20, 30 | Compressed gas |
| 21, 31, 47 | Hydraulic fluid |
| 26, 31, 32, 40, 42 | Hydraulic fluid transfer line |
| 35, 36 | Storage chamber |
| 43 | Container |
| 44 | Internal lining element |
| 45 | Fluid loop |
| 48 | Gas |
| 49 | Recirculation pump |
| 51 | Balloon |
| 52 | Solar collector |
| 53 | Thermal exchange coil |
| 54 | Compressed air storage coil |
| 60 | Plate exchanger |
| 61, 62 | Channel |
| 63 | Flat plate |
| 64, 65 | Corrugated plate |
| B1, B1 | Containers |
| V11, V12, V21, V22 | Valves |
| V41, V42 | Valves |
| V312 | Three-way valve |
| V51, V52, V53, V54 | Valves |
| P1 | Pump |
| T1 | Expansion valve |

DETAILED DESCRIPTION OF EMBODIMENTS

Figure 1:
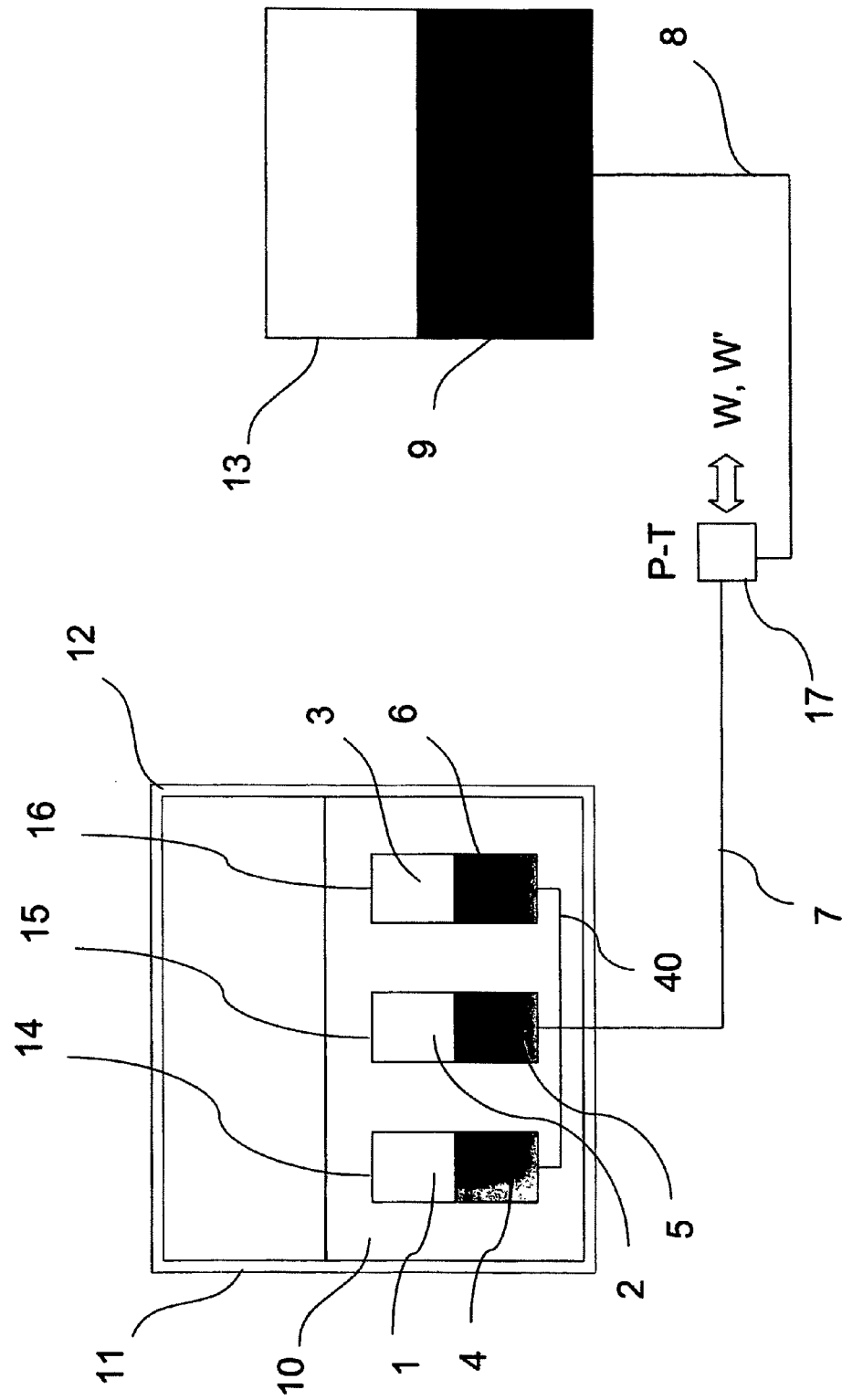
FIG. 1 is a diagram showing the basic principle of the mechanical energy storage system.

As illustrated in FIG. 1, in accordance with the invention, the mechanical energy is stored in a gas 1, 2, 3, which is compressed by means of a hydraulic fluid 4, 5, 6. The compressed gas is contained in at least one container 14, 15, 16, and preferably in a plurality of containers 14, 15, 16 connected fluidically to one another by a line 40. The at least one container 14, 15, 16 is placed in a chamber 11, which contains a thermal storage medium 10, configured to absorb and restore the heat released by the compression of the gas 1, 2, 3 by keeping it sufficiently isothermal. The chamber 11 is preferably surrounded by a thermal insulator 12.

A hydraulic fluid 9 is stored in a storage chamber 13, and is routed by the line 8 to compression-expansion means preferably constituted by a reversible P-T device 17.

The P-T device 17 may be a reversible compression-expansion device 17 configured to either pump the hydraulic fluid 9 by receiving an amount of mechanical energy W, which leads to the compression of the gas 1, 2, 3, or the expansion of the fluid 4, 5, 6 routed by the line 7 by producing an amount of mechanical energy W'. Advantageously, P-T device 17 can have means for converting this mechanical energy into electrical energy. Such a device has a very high efficiency, generally greater than 90%. For example, P-T device 17 can be a hydraulic pump with pistons also functioning as a piston motor. Alternatively, P-T device 17 can be a rotary machine of the deformable rhombus type, known, for example, from U.S. Pat. No. 3,295,505 to Jordan.

Figure 2:
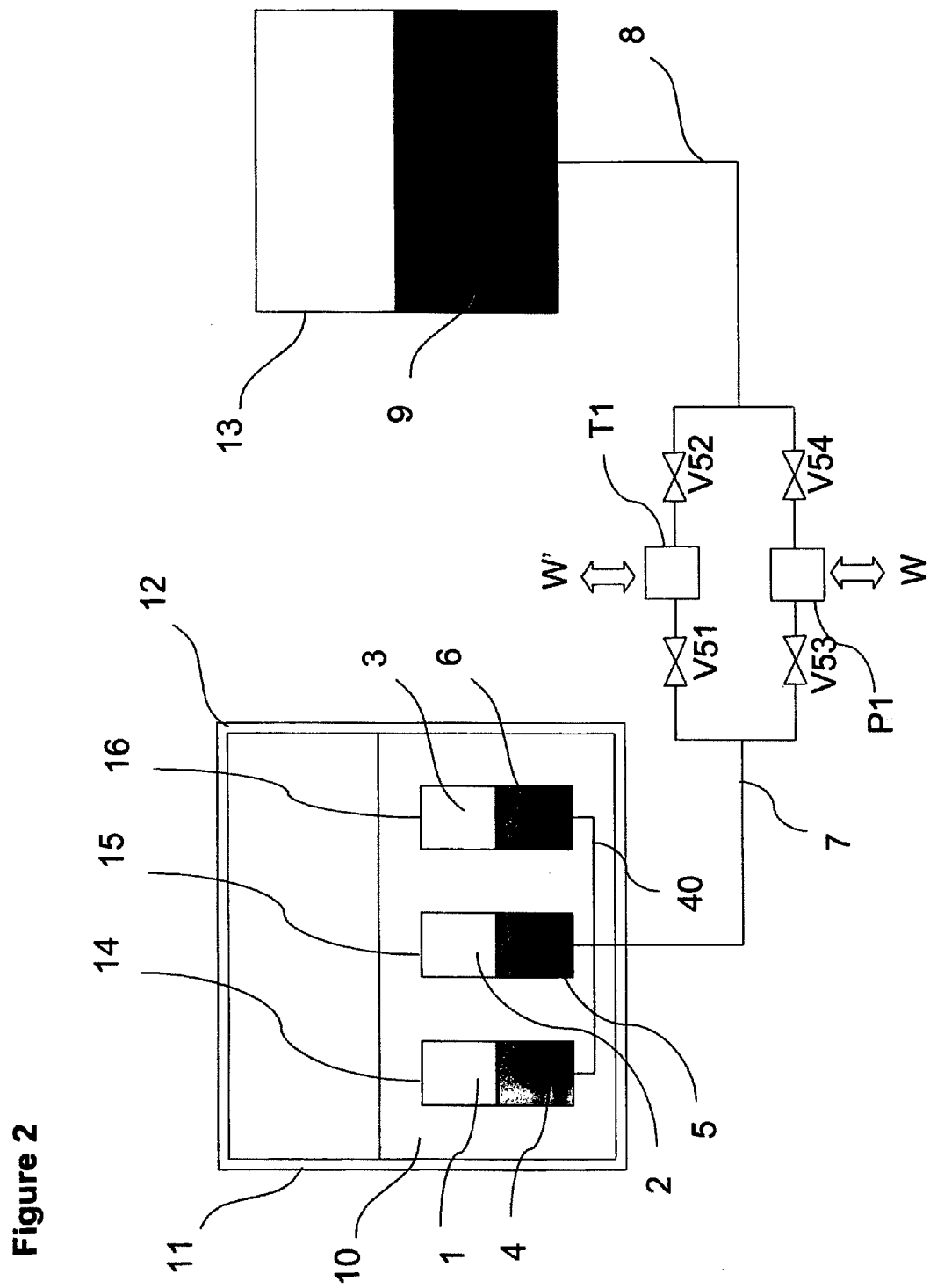
FIG. 2 is a diagram of a first alternative of the system of FIG. 1.

In an alternative embodiment illustrated in FIG. 2, the compression-expansion means can be constituted by a circuit that includes, in parallel, a device P1 configured to pump the hydraulic fluid 9 by receiving an amount of mechanical energy W, and a device T1 enabling an amount of mechanical energy W to be produced by expanding the fluid 4, 5, 6 routed by the line 7. A first pair of valves V51, V52 and a second pair of valves V53, V54 enable the "compression" mode or the "expansion" mode to be selected.

In all embodiments and alternatives of the invention described herein, these two compression-expansion means can be used indifferently; for the sake of simplicity, the invention will be hereinafter described by calling the compression-expansion means a reversible compression-expansion device 17.

A typical embodiment of the system in accordance with the invention is described herein in a simple manner: to store energy, the compression-expansion device 17, or, as indicated hereinabove, another compression-expansion means, pumps hydraulic fluid 9 through the line 7 into the at least one container 14, 15, 16. The level of hydraulic fluid 4, 5, 6 in each respective one of the containers 14, 15, 16 rises, and the surface of the fluid acts as a piston and compresses the gas 1, 2, 3 respectively contained in the containers 14, 15, 16. This compression generates heat, which is then transferred to the thermal storage medium 10. This heat can be restored at the time of the gas expansion; the increase in temperature of the hydraulic liquid 4, 5, 6 in the "compression" mode is normally low, on the order of several degrees at most. If the gas 1, 2, 3, however, is restored to "expansion" mode, it enables the pressure of the gas 1, 2, 3 to rise significantly. If the compressed gas 1, 2, 3 is allowed to expand across the line 7 and the compression-expansion device 17 acting in "expansion" mode, the level of hydraulic fluid 9 in the containers 14, 15, 16 decreases, and the hydraulic fluid 9 causes the energy conversion means of the expansion valve 17 to move in order to generate mechanical energy. This mechanical energy can be converted into electrical energy. The hydraulic fluid 9 is transferred to the line 8 in the storage chamber 13 in which the liquid level rises.

If the gas 1, 2, 3 is air, and if the pressure of the air pressure 1, 2, 3 in the containers 14, 15, 16 becomes, during expansion of the hydraulic fluid 9, lower than the atmospheric pressure, it is possible to cause outside air to enter the containers 14, 15, 16 by means of a valve.

The hydraulic fluid 4, 5, 6, 9 is generally a liquid, and preferably constituted by an aqueous phase, water or glycolated water in order to avoid the risks of freezing. It can also be an organic phase, such as glycol, a mineral oil, an ester, a vegetable oil or phosphate esters.

The gas 1, 2, 3 can be a permanent gas such as air or nitrogen. It can also be another gas such as $CO_2$ or an organic fluid.

The thermal storage medium 10 can be constituted by a liquid (aqueous or organic) and/or by a solid phase optionally with a phase change.

In an alternative embodiment of the method in accordance with the invention, the fluid 1, 2, 3 may take the form of a condensable fluid, and the compression and expansion are performed on a diphasic fluid. This will be explained hereinbelow. The advantage of this alternative is that it enables a stable pressure to be maintained in the containers 14, 15, 16.

Figure 3:
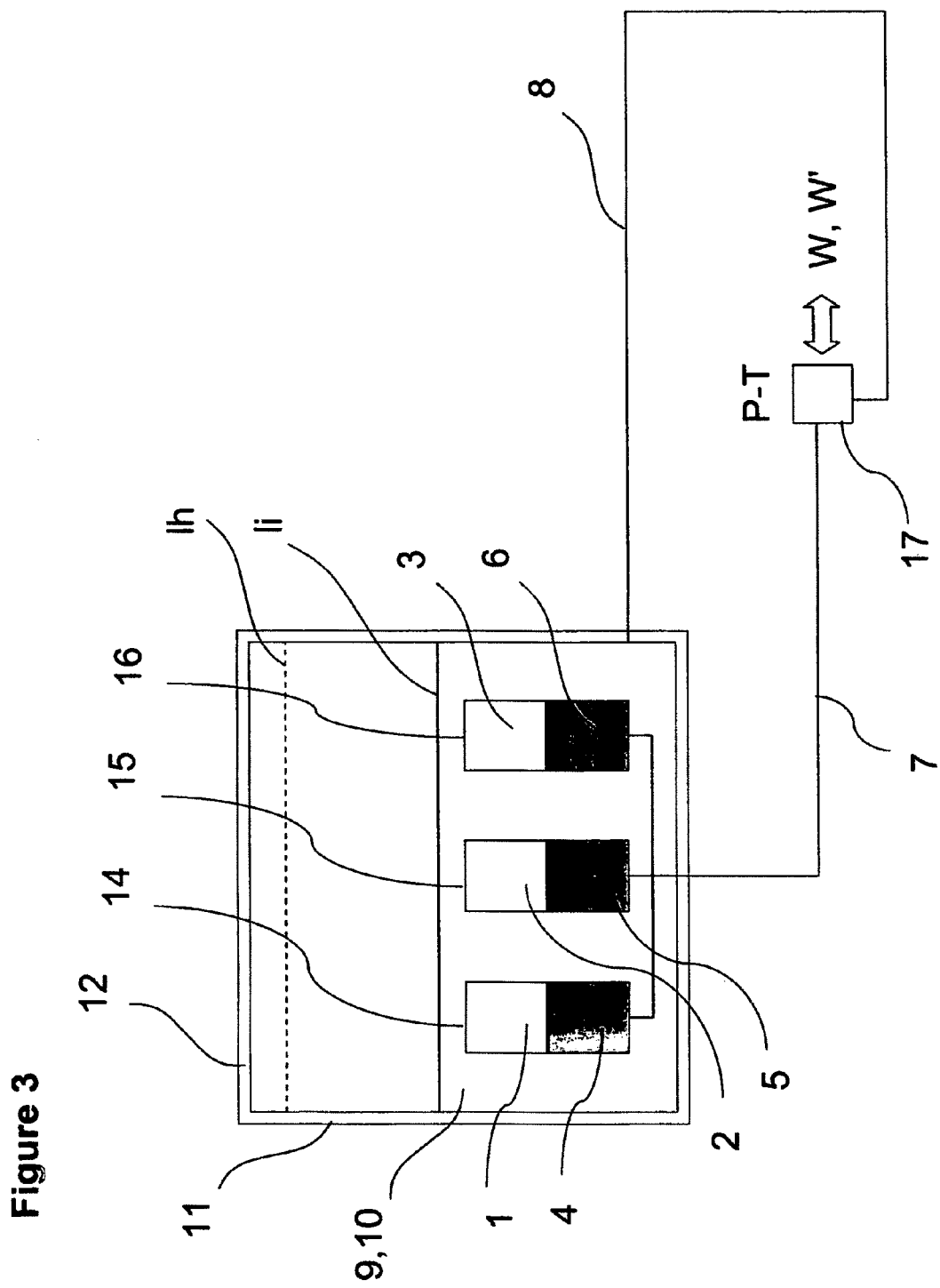
FIG. 3 is a diagram of a second alternative of the system of FIG. 1.

FIG. 3 illustrates a main diagram of an alternative embodiment of the invention. The thermal storage medium 10 is constituted at least partially by the hydraulic fluid 9 used for the compression of the gas 1, 2, 3. The volume of hydraulic fluid 9 is easily capable of keeping the air volume within substantially isothermal conditions. Indeed, if the air is, at the outset, at atmospheric pressure (the storage being performed, for example, between atmospheric pressure and 200 to 600 bars), the MCp coefficient of the air for a given volume is 1.2/4200 times lower than the MCp coefficient of the same water volume necessary to displace it. Warming the initial air volume to 100° C. corresponds to an amount of heat that raises the temperature of the water only by 1.2/42=0.03° C. If, for example, the containers 14, 15, 16 occupy half the volume of the chamber in which they are placed, the level of liquid in the chamber 11 varies between $l_i$ and $l_h$=1.5 $l_i$.

It is also possible to simultaneously have a solid storage phase 10, for example, a phase change material that remains stationary, while the hydraulic fluid 9 circulates. The circulation of the hydraulic fluid 9 then makes it possible to ensure the thermal exchanges under good conditions.

The above arrangement also applies if the gas 1, 2, 3 is condensable. In this case, if the hydraulic fluid 9 is constituted by an aqueous phase, the fluid 1, 2, 3 can be constituted by a hydrocarbon or a fluid such as ammonia or $CO_2$. This condensable gas must not be miscible with the hydraulic fluid, so that the vapor pressure above the liquid phase resulting from the condensation of the gas 1, 2, 3 is always the saturation pressure. There is then a triphasic system: two liquid phases (hydraulic liquid 9+liquid phase resulting from the condensation of the gas 1, 2, 3) and a gaseous phase constituted by the gas 1, 2, 3.

In such an embodiment, during compression and expansion, the pressure in the containers 14, 15, 16 remains constant, thereby facilitating the operating conditions of the reversible compression-expansion device 17 and makes it possible to avoid a decrease in efficiency of the compression-expansion device 17. In addition, it is possible in this case to work with a moderate pressure, which reduces the investment costs.

Figure 4:
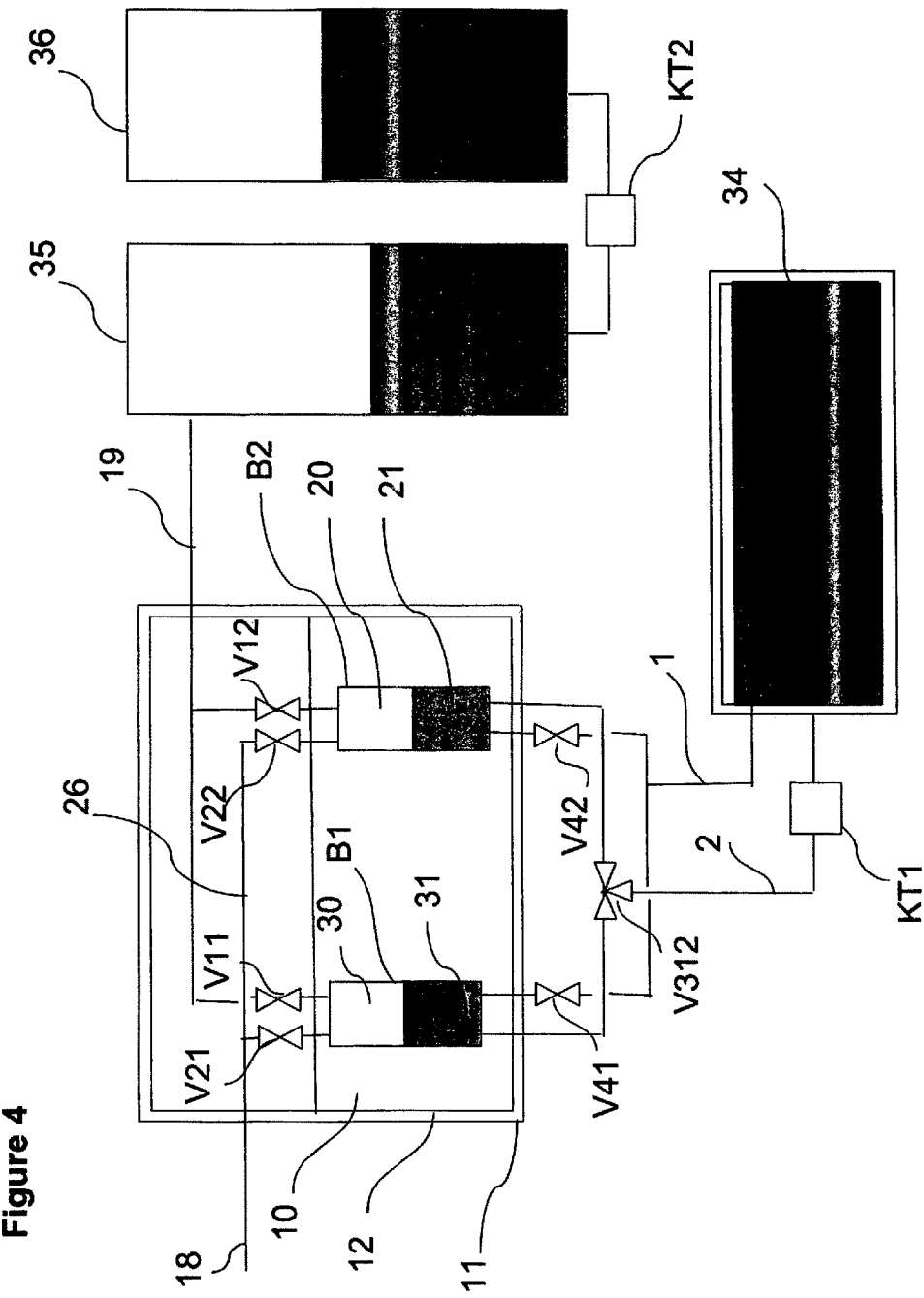
FIG. 4 is a diagram showing an alternative of the system of FIG. 2.

FIG. 4 illustrates an alternative embodiment of the method in accordance with the invention as illustrated in FIG. 3, which differs by the use of an open cycle instead of a closed cycle. The gas used for the energy storage is air taken from the ambient environment by the line 18. This gas, once compressed, is stored in the storage chamber 35. This storage chamber 35 can be constituted by a natural or artificial underground cavity.

The storage system in accordance with the alternative embodiment illustrated in FIG. 4 works with at least two groups of containers B1, B2. During the mechanical energy storage phase, the containers B1 and B2 alternately function in air compression or in air suction.

In a first stage, while the first container B1 suctions the air from the ambient environment by the line 18, the second container B2 compresses the air 20 by means of the fluid 21 pumped by the equipment KT1. The compressed air 20 is then directed toward the storage chamber 35 by the line 19.

In a second stage, while the second container B2 suctions the air from the ambient environment by the line 26, the first container B1 compresses the air 30 by means of the fluid 31 pumped by the equipment KT1. The compressed air 30 is then directed toward the storage chamber 35 by the line 19.

The insulated chamber 11 makes it possible to store the thermal energy released during the compression of the gas in the thermal storage medium 10. This energy storage makes it possible to keep the temperature of the first and second containers B1, B2 almost constant during the mechanical energy storage phase.

During the phase of restitution of the mechanical energy stored by means of the compressed air in the storage chamber 35, the first and second containers B1, B2 also function alternately.

In a first stage, the compressed air contained in the storage chamber 35 is directed toward the second container B2 by the line 19. The second container B2 expands the air 20 by means of the fluid 21 expanded by the equipment KT1. At the same time, the first container B1 discharges the air into the ambient environment by the line 18.

In a second stage, the compressed air contained in the storage chamber 35 is directed toward the first container B1 by the line 19. The first container B1 expands the air 30 by means of the hydraulic fluid 31 expanded by the equipment KT1. At the same time, the second container B2 discharges the air into the ambient environment by the line 18.

The thermal energy stored in the compression phase in the thermal storage medium 10 enables the temperature of the first and second containers B1, B2 to be maintained during the expansion phase. The thermal equilibrium ensuring the isothermal character of the compression and expansion can be achieved by any type of device intended to promote the heat exchange between the hydraulic fluids 21, 31 and the thermal storage unit 10 such as a coil (not shown in FIG. 4). The circulation occurring at the time of the compression and expansion can help to standardize the temperatures. Additional circulation or mixing means can be introduced for this purpose.

It is possible to ensure a constant pressure in the storage chamber 35, by introducing, in the chamber containing the compressed gas, a variable volume of hydraulic fluid, which volume is regulated so as to keep the pressure constant. The hydraulic fluid can be introduced from a storage chamber 36 at atmospheric pressure. During the step of energy production from the storage, a fraction of the restored energy is used to pump the hydraulic fluid. At the time of the energy storage step, this energy is restored. The system works because the energy needed to compress a liquid from atmospheric pressure to a relatively high pressure P is much lower than the energy needed to compress a gas from atmospheric pressure to pressure P.

Figure 6:
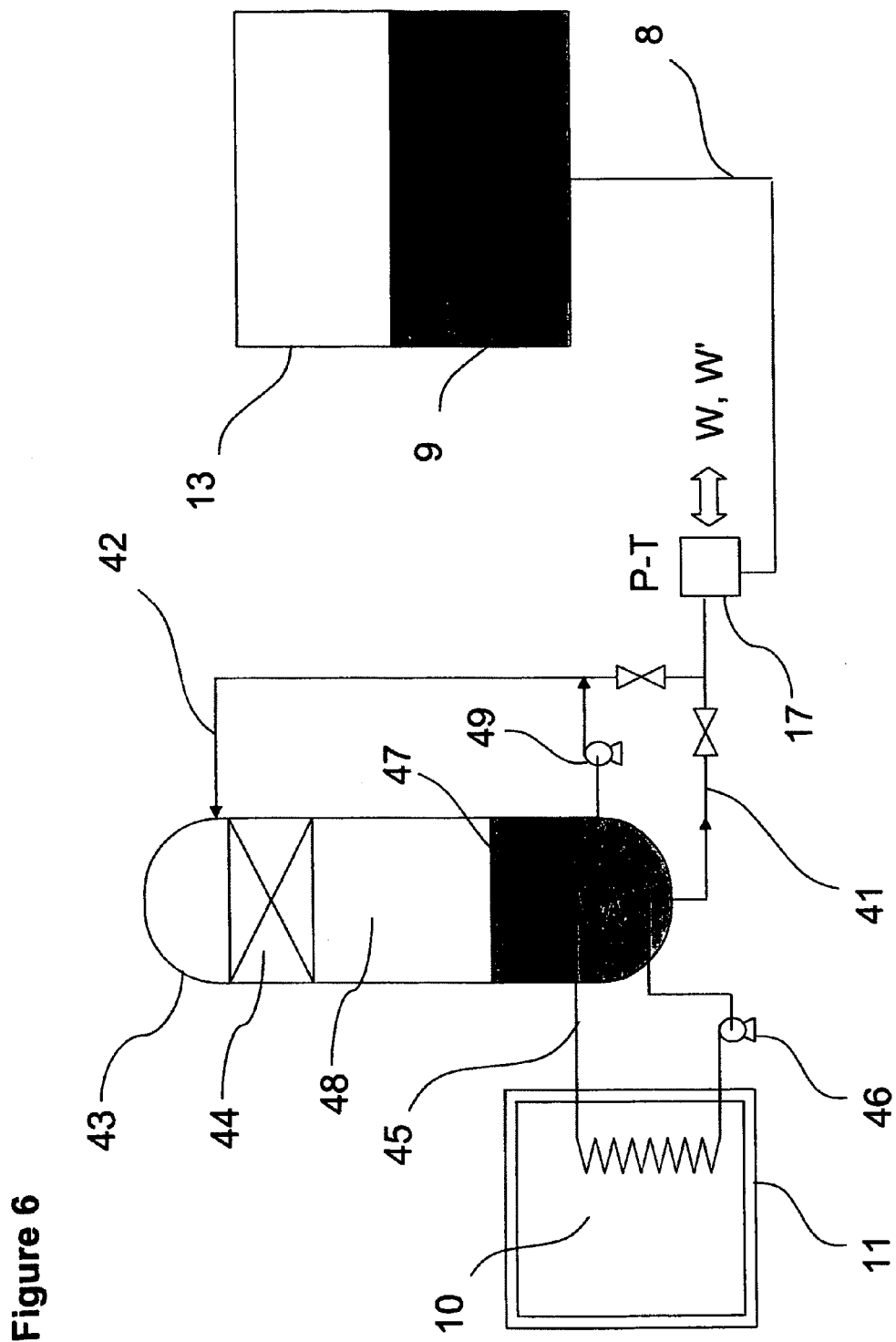
FIG. 6 is a diagram showing another alternative of the system of FIG. 1.

The alternative embodiment illustrated in FIG. 6 differs from the diagram illustrated in FIG. 1 by the use of an indirect transfer of the thermal energy released during the compression of the gas toward the chamber 11. In this alternative embodiment, the possibility of using an internal lining element 44 in the container 43 in order to improve the gas-liquid contact is also presented. For this, a recirculation loop 42 for the hydraulic fluid can also be activated by the use of a recirculation pump 49.

In this configuration, in the mechanical energy storage phase, the hydraulic fluid 9 stored in the storage chamber 13 is routed by the line 8 to the pump 17, then by the line 42 to the container 43 in order to compress the gas 48. The contactor 44 makes it possible to keep the gas quasi-isothermal and to transfer the calories to the hydraulic fluid 47. A fluid loop 45 makes it possible to transport the calories from the fluid 47 to the thermal storage medium 10.

In the mechanical energy restitution phase, the gas 48 is expanded by releasing the fluid 47 by the line 41 toward the reversible compression-expansion device 17, then by the line 8 toward the storage chamber 13. During this phase, the recirculation of the hydraulic fluid 47 activated by the pump 46 makes it possible to keep the temperature of the gas 48 quasi-constant. The fluid loop 45 makes it possible to restore the calories stored in the thermal storage medium 10 to the hydraulic fluid 47.

Figure 5:
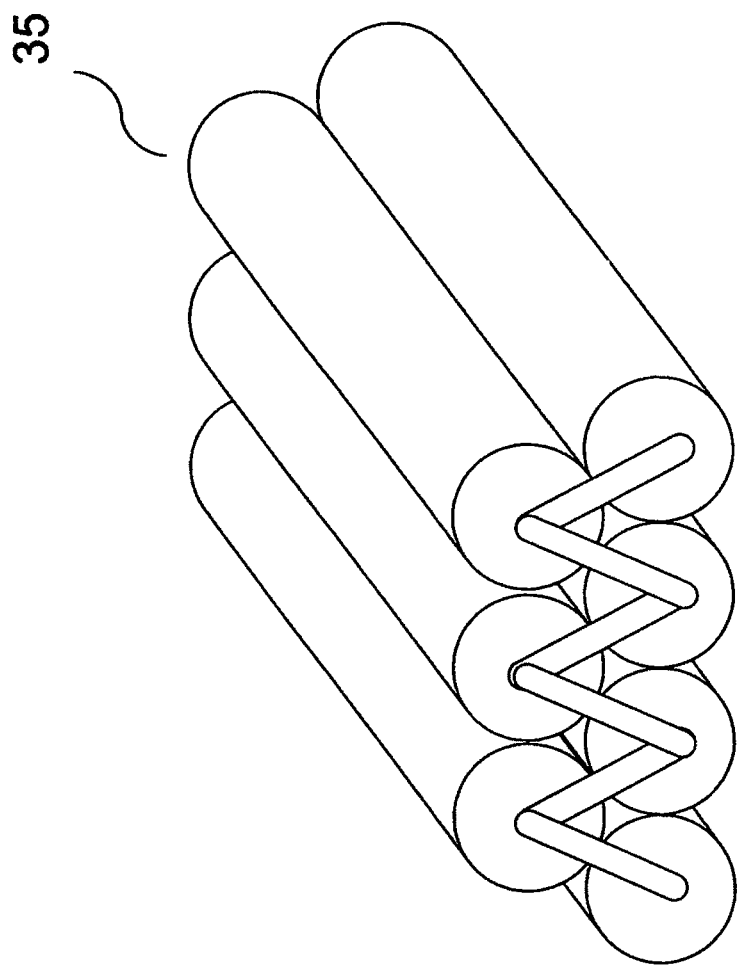
FIG. 5 is a diagram showing another embodiment of the storage chamber.
Figure 7:
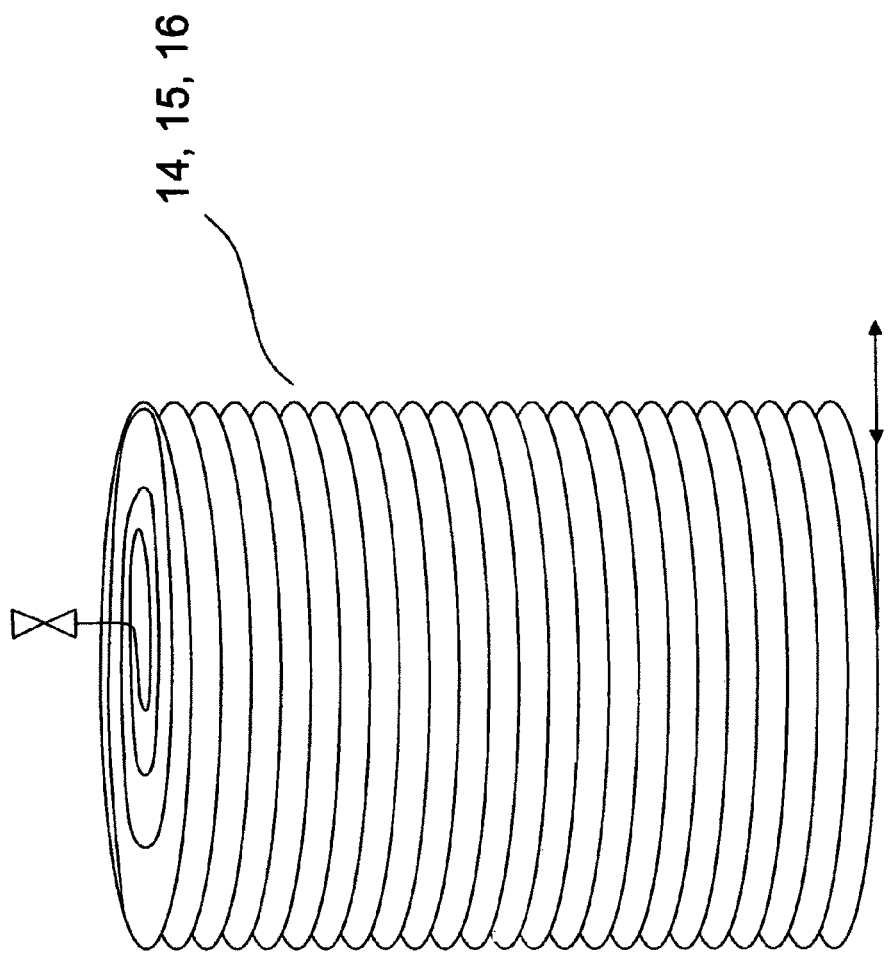
FIG. 7 is a detail view showing a possible implementation of the diagram of FIG. 1.

FIG. 7 illustrates an example embodiment of the containers 14, 15, 16 of FIGS. 1 and 2, which can each be made in the form of a tube, preferably wound in a spiral. The use of a tube makes the production of pressurized containers easier and facilitates the heat exchanges with the heat exchange medium 10. In another alternative embodiment illustrated in FIG. 5, the storage chamber 35 is made in the form of one or more straight tubes, stacked or not, connected to one another. In general, the use of tubes is advantageous because a tube is a hollow body capable of resisting a high internal pressure, which has a very simple form and which can easily be produced without welding by extrusion processes. A bundle of straight tubes is particularly suitable for large storage systems. As an example, a new bundle of straight steel tubes with a diameter of 122 cm and a length of 10 meters enables around 105 m$^3$ of air to be stored; there are nuances in steels enabling such tubes to be produced that resist an internal pressure of over 250 bar.

Figure 8:
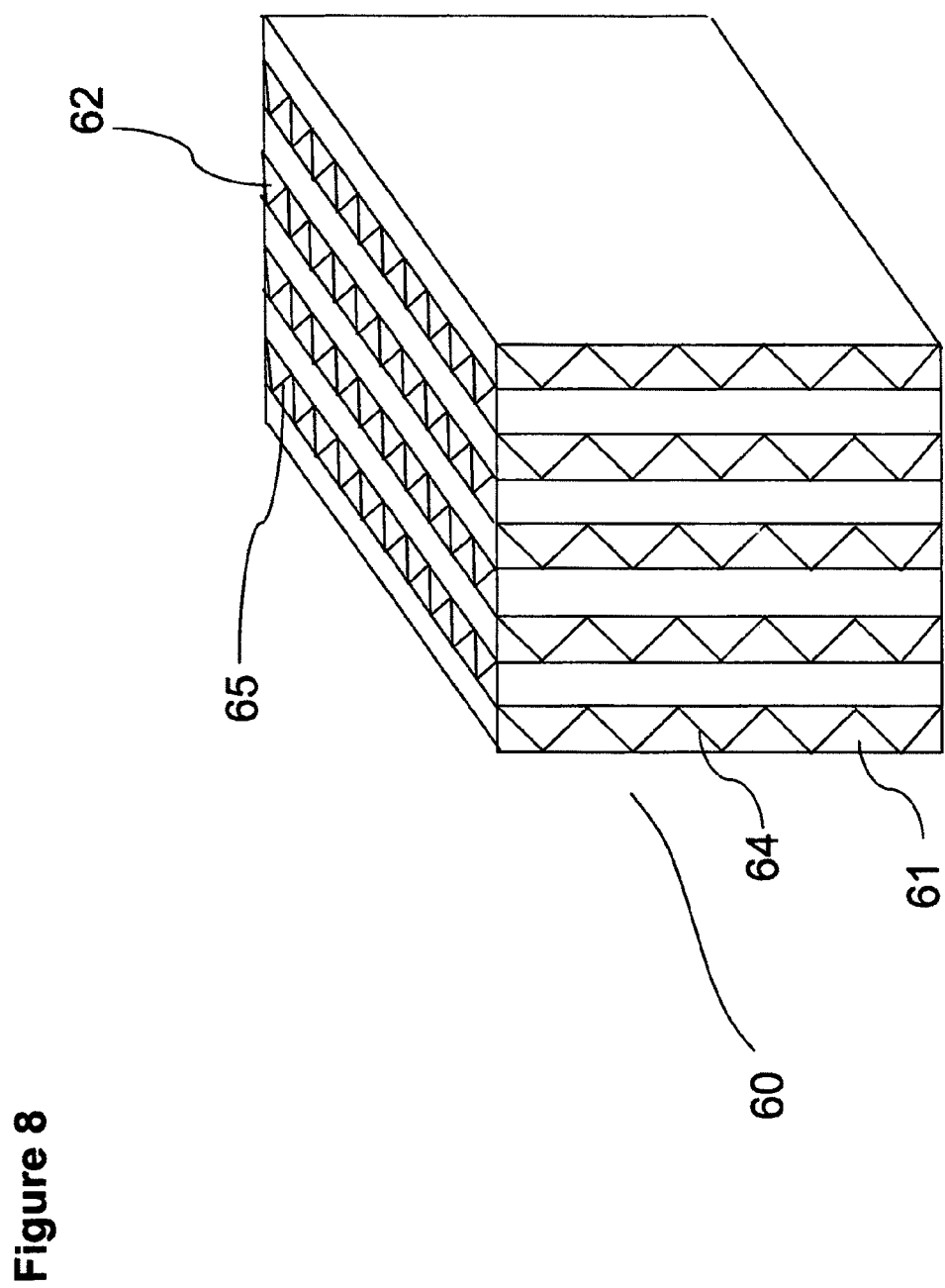
FIG. 8 diagrammatically shows a plate exchanger, capable of being used in the context of this invention.

As illustrated in FIG. 8, the container 14, 15, 16 can also be constituted by a plate exchanger 60. A plate exchanger makes it possible to develop a large exchange surface between two thermal media in a restricted volume. Such an exchanger can typically be constituted by a stack consisting of a plurality of flat plates 63 and a plurality of corrugated plates 64, 65, which thereby form two networks of channels 61, 62. In each of the networks of channels, a fluid can circulate. One of the fluids is a hydraulic fluid 4, 5, 6 with a gas 1, 2, 3, and the other fluid is the fluid that constitutes the thermal storage medium 10. Advantageously, a configuration with a cross-flow or a counter-current is used. The cross-flow alternative is illustrated in FIG. 8, in which the channels formed by two adjacent corrugated plates are turned at 90°.

Figure 9:
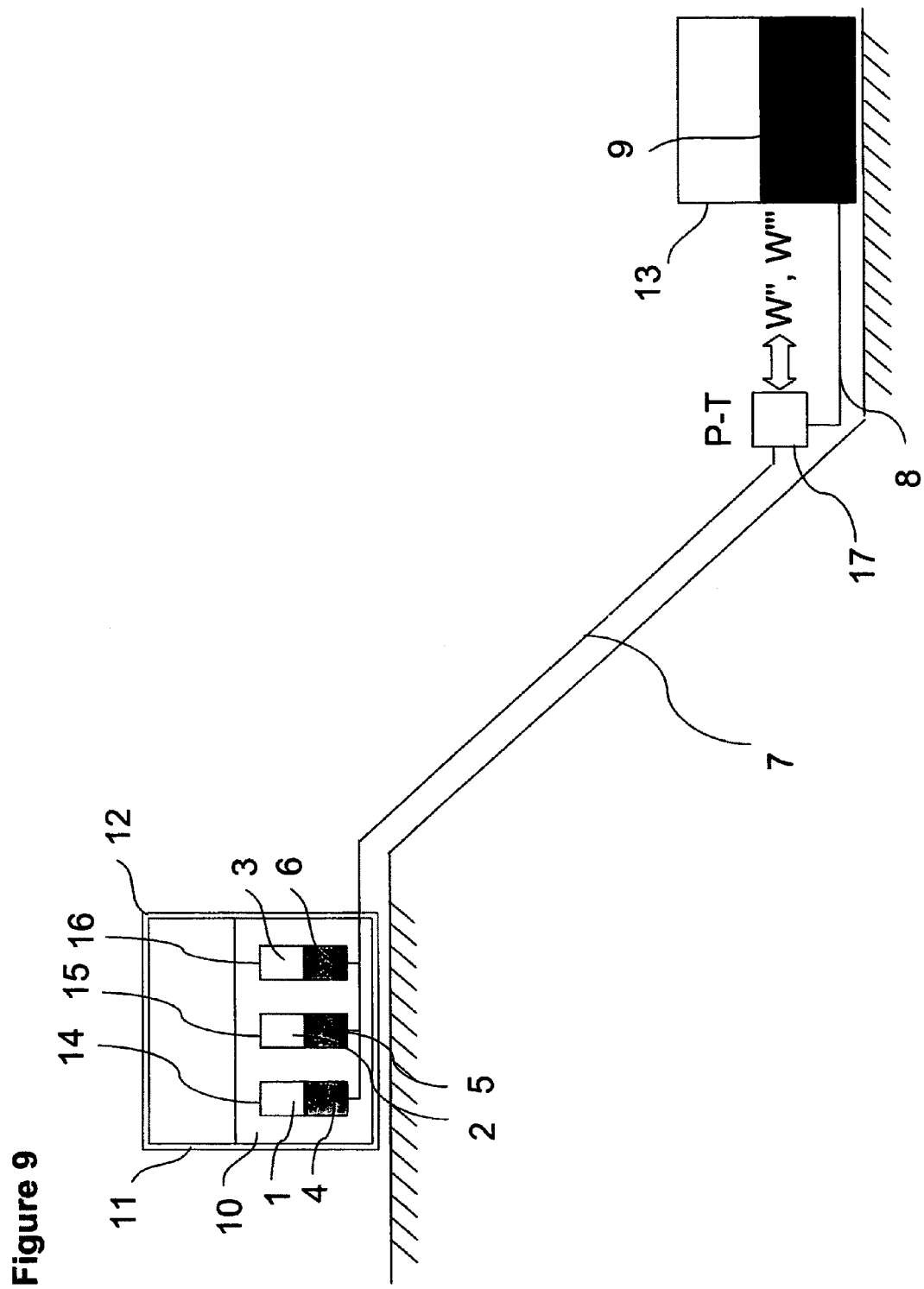
FIG. 9 is a diagram showing another alternative of the system of FIG. 1, in which the storage chamber is located at a lower level than the containers.

The alternative embodiment illustrated in FIG. 9 differs from the diagram illustrated in FIG. 1 by a particular location of the chamber 11 with respect to the storage chamber 13. It is indeed possible to combine the principle of hydro-pneumatic storage with that of gravity storage. In this alternative embodiment, the hydraulic fluid 4, 5, 6 contained in the containers 14, 15, 16 descends by gravity through the line 7 and to the reversible compression-expansion device 17 in the storage chamber 13, which is located at a lower level/height with respect to the chamber 11.

In this alternative embodiment, during energy storage phases, the pump 17 must provide more mechanical energy W″ in order to raise the hydraulic fluid 9 and compress the gas 1, 2, 3. In energy restitution phases, the expansion of the gas 1, 2, 3 is coupled to the difference in height of the hydraulic fluid 4, 5, 6 in order to provide a mechanical energy W‴.

Figure 10:
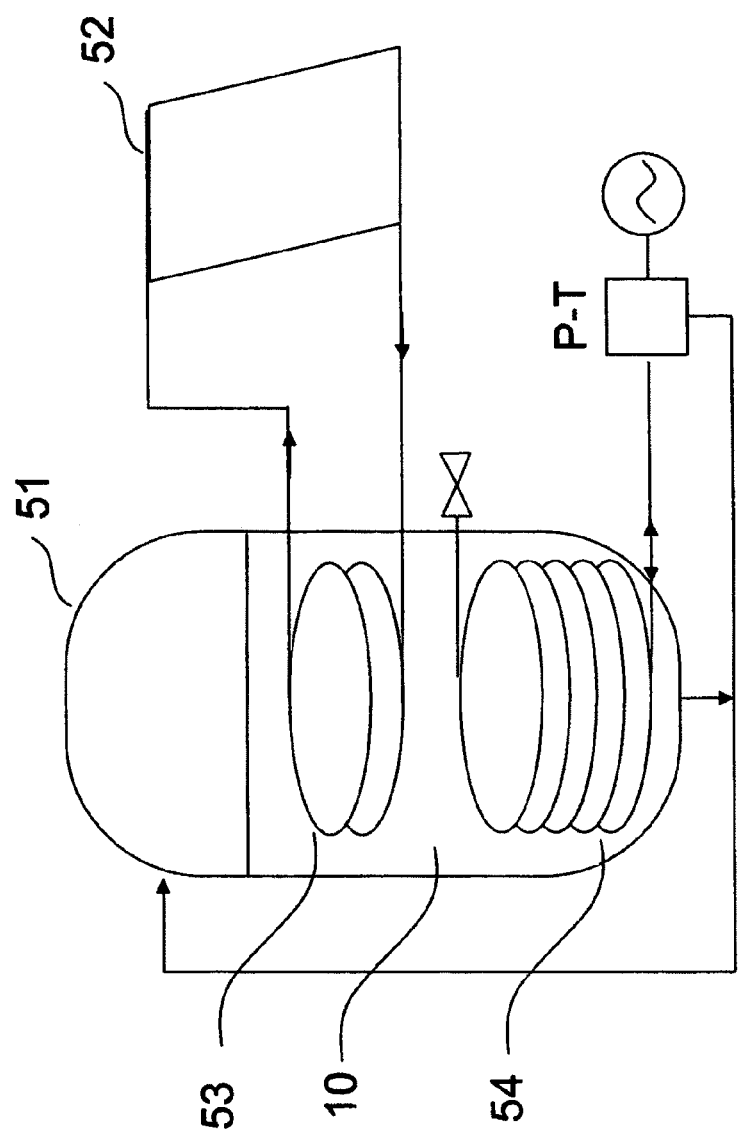
FIG. 10 is a diagram showing another embodiment of the invention, in which the thermal storage medium is heated by a solar collector.

FIG. 10 diagrammatically illustrates another embodiment of the invention in which, before the gas 1, 2, 3 expansion phase, thermal energy outside the gas is provided. This thermal energy can come from different external sources. Advantageously, such a device includes a solar collector 52 such as a thermal energy source, which is connected to a thermal exchange coil 53 containing a heat transfer fluid and which is immersed in the storage medium 10 contained in a balloon 51. In this embodiment, the compressed air is also stored inside a coil 54, and the storage medium 10 is the hydraulic fluid itself. It is obviously possible to produce other embodiments, in which the storage medium 10 is heated by a solar collector 52 or by a heat source with a low temperature difference, with the understanding that it is one of the specificities of the quasi-isothermal system and process in accordance with the invention to be capable of utilizing the calories provided to it with a very low temperature difference. If the storage medium 10 is heated by one degree, this already enables a significant pressure to be created and which can be used in the gas 1, 2, 3, which can be converted with a high mechanical energy efficiency by means of the compression-expansion means.

This embodiment makes it possible, after compression of the gas 1, 2, 3, to heat the thermal storage medium 10 by means of the solar collector 52. This thermal energy is transferred to the gas 1, 2, 3 by the thermal storage medium 10 and causes an increase in its pressure, which can be converted, with high efficiency, into additional mechanical energy.

This invention can be better understood with two non-limiting examples of mechanical energy storage described below.

Example 1

Example 1, described in reference to FIG. 1, makes it possible to illustrate a first configuration of an implementation of the invention. In this example, the captive gas 1, 2, 3 is nitrogen contained in 3 1-m³ cylinders. The total nitrogen mass is 344 kg. It is initially at a pressure of 100 bar and a temperature of 20° C. At time t=0, the pumping of water into the containers 14, 15, 16 is begun with a flow rate of 1.83 m³/h. As the containers 14, 15, 16 have a limited contact surface with the medium 10, the gas 1, 2, 3 is heated substantially during this compression phase. At time t=60, the pressure of the gas is 360 bar and its temperature is 75° C. This step makes it possible to store 9 kWh of mechanical energy. At this time, the system continues to the decompression phase, drawing off an identical flow rate of 1.83 m³/h of water from the containers 14, 15, 16. At time t=112 min, the gas returns to a pressure of 100 bar and a temperature of 1° C. This second phase makes it possible to restore 7.5 kWh of mechanical energy. The efficiency of the system is therefore 83%.

Example 2

Example 2, described in reference to FIGS. 1 and 7, makes it possible to illustrate a second configuration of an implementation of the invention. In this example, the captive gas 1, 2, 3 is nitrogen contained in 3 wound tubes, as illustrated in FIG. 7. Each tube can contain a gas volume of 1 m³. The total nitrogen mass is 344 kg. It is initially at a pressure of 100 bar and a temperature of 20° C. At time t=0, the pumping of water into the containers (14, 15, 16) is begun with a flow rate of 1.96 m³/h. As the containers 14, 15, 16 have a large contact surface with the medium 10, the gas 1, 2, 3 is heated very little during this compression phase. At time t=60 min, the pressure of the gas is 360 bar and its temperature is 40° C. This step makes it possible to store 9.4 kWh of mechanical energy. At this time, the system continues to the decompression phase, drawing off an identical flow rate of 2 m³/h of water from the containers 14, 15, 16. At time t=120 min, the gas returns to a pressure of 100 bar and a temperature of 17° C. This second phase makes it possible to restore 9 kWh of mechanical energy. The efficiency of the system is therefore 96%.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A system for storing energy comprising:
a first chamber;
a thermal energy storage medium contained in the first chamber;
at least one container containing a hydraulic fluid and a gas;
at least one storage chamber containing the hydraulic fluid; and
compression-expansion means configured to operate between a compression mode which pumps the hydraulic fluid and an expansion mode which expands the hydraulic fluid,
wherein:
at least one of the hydraulic fluid and the gas contained in the at least one container is in thermal contact with the thermal energy storage medium;
the at least one container is fluidically connected to the at least one storage chamber by lines which enable the hydraulic fluid to be transported between the at least one container and the at least one storage chamber, across the compression-expansion means; and
the compression-expansion means is configured to pump the hydraulic fluid from the at least one storage chamber to the at least one container, and also configured to expand the hydraulic liquid contained in the at least one container toward the at least one storage chamber, to thereby generate mechanical energy, and
wherein the at least one container comprises a spiral tube.

2. The system of claim 1, wherein the compression-expansion means comprise means for converting the generated mechanical energy into electrical energy.

3. The system of claim 1, wherein the energy storage is obtained by compression of the gas contained in the at least one container by the hydraulic liquid which is pumped with said compression-expansion means.

4. The system of claim 1, wherein the gas comprises a condensable gas.

5. The system of claim 4, wherein the gas comprises a gas selected from the group consisting of hydrocarbons, $CO_2$, fluorinated hydrocarbons and fluorinated alkanes.

6. The system of claim 1, wherein the thermal storage medium comprises a phase change material.

7. The system of claim 1, wherein the at least one container is located inside the first chamber.

8. A system for storing energy comprising:
a first chamber;
a thermal energy storage medium contained in the first chamber;
a first group of containers containing a hydraulic fluid and a gas;
a second group of containers containing the hydraulic fluid and the gas;
at least one storage chamber containing the hydraulic fluid; and
compression-expansion means configured to operate between a compression mode which pumps the hydraulic fluid and an expansion mode which expands the hydraulic fluid,
wherein:
at least one of the hydraulic fluid and the gas contained in the first and second group of containers is in thermal contact with the thermal energy storage medium;
the first and second group of containers are fluidically connected to the at least one storage chamber by lines which enable the hydraulic fluid to be transported between the at least one container and the at least one storage chamber, across the compression-expansion means;
the compression-expansion means is configured to pump the hydraulic fluid from the at least one storage chamber to the first and second group of containers, and also configured to expand the hydraulic liquid contained in the first and second group of containers towards the at least one storage chamber, to thereby generate mechanical energy; and
during an mechanical energy storage phase, the first group of containers and the second group of containers alternately function in air compression and air suction, and wherein the first and second group of containers comprise a spiral tube.

9. The system of claim 8, wherein the gas comprises ambient air.

10. The system of claim 8, wherein the first and second groups of containers are located inside the first chamber.

11. The system of claim 8, wherein the compression-expansion means comprise means for converting the generated mechanical energy into electrical energy.

12. The system of claim 8, wherein the energy storage is obtained by compression of the gas contained in the first and second group of containers are by the hydraulic liquid which is pumped with the compression-expansion means.

13. The system of claim 8, wherein the gas comprises a condensable gas.

14. The system of claim 8, wherein the thermal storage medium comprises a phase change material.

15. A system for storing energy comprising:
a first chamber;
a thermal energy storage medium contained in the first chamber;
at least one container containing a hydraulic fluid and a gas such that at least one of the hydraulic fluid and the gas is in thermal contact with the thermal energy storage medium;
at least one storage chamber containing the hydraulic fluid; and
compression-expansion means configured to operate between a compression mode which pumps the hydraulic fluid and an expansion mode which expands the hydraulic fluid,
wherein:
the at least one container is fluidically connected to the at least one storage chamber by lines which enable the hydraulic fluid to be transported between the at least one container and the at least one storage chamber, across the compression-expansion means;
the compression-expansion means is configured to pump the hydraulic fluid from the at least one storage chamber to the at least one container, and also configured to expand the hydraulic liquid contained in the at least one container toward the at least one storage chamber, to thereby generate mechanical energy; and
the at least one container is located outside of the first chamber such that a fluid loop ensures thermal contact between the thermal storage medium and the hydraulic fluid contained in the at least one container.

16. The system of claim 15, wherein the at least one container comprises an internal lining element configured to enhance gas-liquid contact.

17. The system of claim 16, wherein:
in a mechanical energy storage phase, the hydraulic fluid in the storage chamber is routed via a first line to the compression-expansion means and then via a second line to the at least one container in order to compress the gas; and
in a mechanical energy restitution phase, the gas is expanded by releasing the hydraulic fluid via a third line to the compression-expansion means, and then by the first line to the storage chamber.

18. The system of claim 17, wherein:
in an energy storage phase, the internal lining element is configured to maintain the gas in a quasi-isothermal state and to transfer the calories to the hydraulic fluid with the fluid loop enabling the calories to be transferred from the fluid to the thermal storage medium; and
in an energy restitution phase, the fluid loop is configured to ensure that the calories stored in the thermal storage medium are restored to the hydraulic fluid.

* * * * *